A. SOBECK.
DEVICE FOR SEPARATING THE WHITES AND YOLKS OF EGGS.
APPLICATION FILED JULY 24, 1916.
1,214,720.
Patented Feb. 6, 1917.
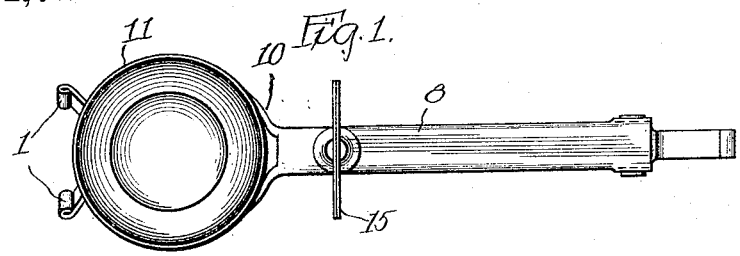
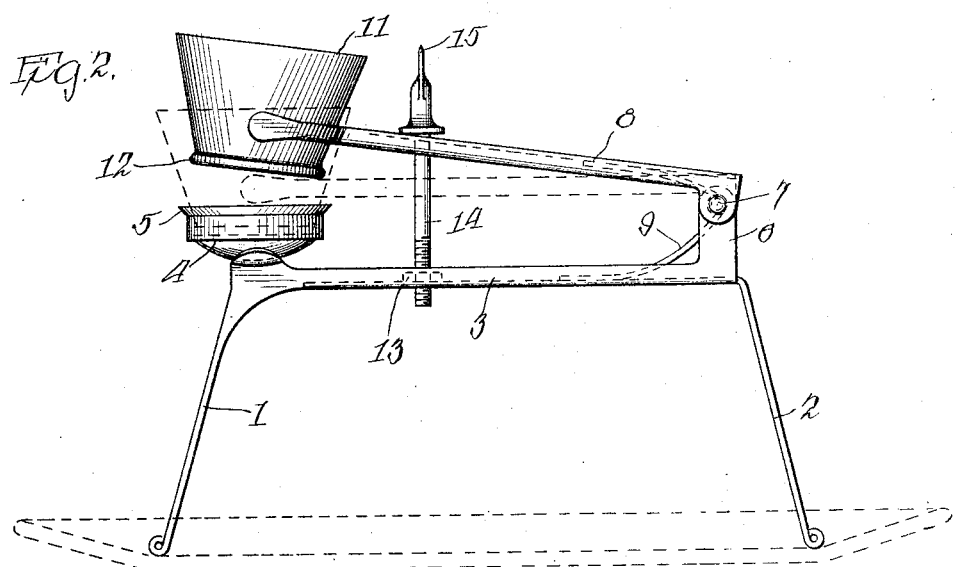
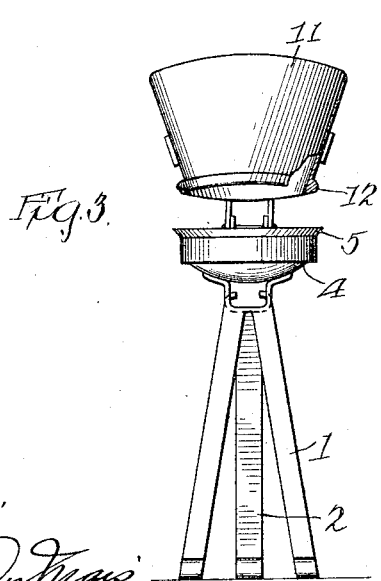
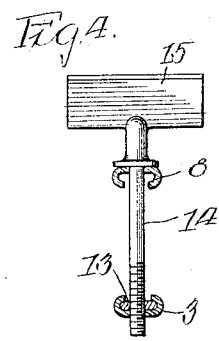
Witness:
Leo J. DuKans
Inventor:
August Sobeck
By Root Klotz
Atty.

UNITED STATES PATENT OFFICE.

AUGUST SOBECK, OF CHICAGO, ILLINOIS.

DEVICE FOR SEPARATING THE WHITES AND YOLKS OF EGGS.

1,214,720.     Specification of Letters Patent.     Patented Feb. 6, 1917.

Application filed July 24, 1916. Serial No. 110,867.

*To all whom it may concern:*

Be it known that I, AUGUST SOBECK, a subject of the Emperor of Germany, residing in Chicago, Illinois, have invented certain new and useful Improvements in Devices for Separating the Whites and Yolks of Eggs, of which the following is a specification.

The essential object of this invention is to provide a simple and yet effective appliance for separating the whites and yolks of eggs.

In the drawings, Figure 1 is a top plan view of a device embodying the invention; Fig. 2 is an elevation or view taken at right angles to Fig. 1; Fig. 3 is an end view looking toward the right in either Figs. 1 or 2; and Fig. 4 is a detail of the device for breaking or cracking the egg.

The movable parts are supported upon standards or struts 1 and 2, and a base 3 extends from the forward standard 1 to the rear standard 2 supporting the different movable parts. At the forward end the base 3 carries a cup 4, preferably provided with an outwardly-flaring annular lip 5, the cup being of a size equal to the size of the yolk of an average egg.

To the base 3 the upright 6 is fastened, and at 7 the movable arm 8 is pivoted, the movable arm 8 being normally pressed upwardly or away from the base 3 by the spring 9. At the left end, Figs. 1 and 2, the pivoted arm 8 terminates in a bifurcated yoke 10, and within this yoke the funnel 11 is placed, said funnel being shaped like a truncated cone. At its bottom, said funnel 11 bears the annular ring or boss 12, which is provided for reinforcing purposes, and the parts are of such size and shape that when the funnel 11 and pivoted arm 8 are depressed to the dotted line position, Fig. 2, the lower end or mouth of the funnel 11 will fit and be received within the cup 4.

The base 3 supports the nut 13, which is interiorly screw-threaded, and the bolt 14 which passes through the pivoted arm 8 is received within said nut 13. At its upper end, Figs. 2 and 4, said bolt 14 carries the sharp blade 15 which serves to break or crack the shells of the eggs. If it be desired at any time to hold the parts permanently in the dotted line position, Fig. 2, that can ordinarily be accomplished simply by tightening the bolt 14 so that it permanently retains the movable arm 8 and funnel 11 carried thereupon in the dotted line position.

The method of operation is as follows: The shells of the eggs can be cracked either by striking them upon the upper edge of the blade 15 or in any other manner, and then the entire contents of the shell of the egg, including both the yolk and white, is poured into the upper end or mouth of the funnel 11. When the contents reach the cup 4, which, as previously stated, is just large enough to receive the yolk, the yolk will remain in said cup 4 while the white will flow over the lip 5 and can be collected in a suitable receptacle to be placed beneath the cup 4. If desired, the funnel can be depressed to the dotted line position, Fig. 2, before the contents of the egg are dropped or poured into the funnel, and the white and yolk permitted momentarily to settle; after which the movable parts may be permitted to snap to the full line position, Fig. 2, thus releasing the white of the egg which will overflow from the cup 4 and be caught in the dish or receptacle provided for that purpose. The yolk can be poured into a separate receptacle after the white has been divided or separated from the yolk.

Although the primary object of the invention is to separate the whites and yolks as hereinbefore described, it is obvious that if the bolt 14 be tightened and the funnel 11 be permanently retained in the dotted line position, Fig. 2, the entire contents of the egg, both white and yolk, will be retained within the cup and the funnel, and in this manner the invention may be used for testing purposes if so desired.

I claim as my invention:

1. A device for separating the white from the yolk of an egg comprising a fixed cup in size adapted to receive the yolk of the egg, and a funnel mounted to move toward and away from said cup, the smaller end of said funnel being adapted to be received within the cup.

2. A device for separating the white from the yolk of an egg consisting of a base, a cup supported thereupon, the cubic capacity of said cup being approximately equal to the cubic capacity of the yolk of the egg, and a funnel pivotally mounted upon and movable toward or away from said cup, the lower end of said funnel being adapted to be received within said cup.

3. A device of the character described comprising a base, a cup, the cubic capacity of which is substantially the same as the cubic contents of the yolk of an egg, an arm in pivotal relation to said base, a funnel secured upon said arm, one end of said funnel being adapted to be received within said cup, and means coöperating with said arm and said base and adapted to draw said members toward each other and hold the same in fixed relation to each other.

In testimony whereof I have affixed my signature.

AUGUST SOBECK.

Copies of this patent may be obtained for five cents each, by addressing the "Commissioner of Patents, Washington, D. C."